United States Patent
Chui et al.

(10) Patent No.: US 7,003,615 B2
(45) Date of Patent: Feb. 21, 2006

(54) TRACKING A NON-POSTED WRITES IN A SYSTEM USING A STORAGE LOCATION TO STORE A WRITE RESPONSE INDICATOR WHEN THE NON-POSTED WRITE HAS REACHED A TARGET DEVICE

(75) Inventors: Kwong-Tak A. Chui, Cupertino, CA (US); Shun Wai Go, San Jose, CA (US); Mark D. Hayter, Menlo Park, CA (US); Chun H. Ning, Cupertino, CA (US); Amy K. Silveria, El Granada, CA (US)

(73) Assignee: Broadcom Corporation, Irvine, CA (US)

( * ) Notice: Subject to any disclaimer, the term of this patent is extended or adjusted under 35 U.S.C. 154(b) by 610 days.

(21) Appl. No.: 10/127,130

(22) Filed: Apr. 22, 2002

(65) Prior Publication Data
US 2003/0200383 A1    Oct. 23, 2003

(51) Int. Cl.
*G06F 13/36*    (2006.01)
(52) U.S. Cl. ............... 710/311; 710/5; 710/15; 710/260; 711/156
(58) Field of Classification Search ............... 710/306, 710/305, 5, 32–34, 310, 311, 6, 15; 719/317; 709/217; 711/154, 156
See application file for complete search history.

(56) References Cited

U.S. PATENT DOCUMENTS

| | | | | |
|---|---|---|---|---|
| 5,799,161 A | * | 8/1998 | Merrick | 710/305 |
| 5,835,739 A | * | 11/1998 | Bell et al. | 710/309 |
| 6,209,054 B1 | | 3/2001 | Lee | |
| 6,243,781 B1 | | 6/2001 | Gandhi et al. | |
| 6,253,275 B1 | * | 6/2001 | Waldron et al. | 710/260 |
| 6,366,968 B1 | * | 4/2002 | Hunsaker | 710/52 |
| 6,557,048 B1 | * | 4/2003 | Keller et al. | 710/6 |
| 6,629,179 B1 | * | 9/2003 | Bashford | 710/260 |
| 6,721,813 B1 | * | 4/2004 | Owen et al. | 710/6 |
| 6,732,242 B1 | * | 5/2004 | Hill et al. | 711/158 |
| 6,888,843 B1 | * | 5/2005 | Keller et al. | 370/429 |
| 2004/0139267 A1 | * | 7/2004 | Gillespie et al. | 710/306 |
| 2004/0172493 A1 | * | 9/2004 | Askar | 710/305 |

OTHER PUBLICATIONS

SiByte, "Target Applications," http://sibyte.com/mercurian/applications.htm, Jan. 15, 2001, 2 pages.
SiByte, "SiByte Technology," http://sibyte.com/mercurian/technology.htm, Jan. 15, 2001, 3 pages.
SiByte, "The Mercurian Processor," http://sibyte.com/mercurian, Jan. 15, 2001, 2 pages.
SiByte, "Fact Sheet," SB-1 CPU, Oct. 2000, rev. 0.1, 1 page.

(Continued)

*Primary Examiner*—Hong Kim
(74) *Attorney, Agent, or Firm*—Garlick Harrison & Markison LLP (57) ABSTRACT

An apparatus includes a storage location and a write monitor circuit coupled to the storage location. The storage location is configured to store a write response indicator which is capable of indicating a reception of at least one write response. Each write response indicates that a corresponding write has reached a target device of that write. The write monitor circuit is configured to update the write response indicator in response to receiving an indication of a first write response. A computer accessible medium may comprises instructions which, when executed: (i) initialize the write response indicator; and (ii) issue one or more writes to a target device, wherein the target device is configured to response to each of the writes with a write response to be indicated by the write response indicator.

11 Claims, 7 Drawing Sheets

OTHER PUBLICATIONS

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, Letter from Anu Sundaresan, May 18, 2000, 1 page.

"HyperTransport™ I/O Link Specification," Revision 1.03, Oct. 10, 2001, HyperTransport Technology Consortium, pp. 38-40, 45-46.

* cited by examiner

FIG. 7 ns and writes will be processed (and reach the target device) in the order issued. Thus, this mechanism may not ensure that the write has reached the target device.

TRACKING A NON-POSTED WRITES IN A SYSTEM USING A STORAGE LOCATION TO STORE A WRITE RESPONSE INDICATOR WHEN THE NON-POSTED WRITE HAS REACHED A TARGET DEVICE

BACKGROUND OF THE INVENTION

1. Field of the Invention

This invention is related to the field of processors and systems employing processors, and more particularly to tracking non-posted writes in such systems.

2. Description of the Related Art

A processor typically uses read and write transactions (generated in response to load and store instructions, respectively, in the software executing on the processors) to communicate with various devices included in the system with the processor. Among other things, the reads and writes may be used to configure the devices (e.g. during initial bring up of the system), to change the configuration during operation, to control the devices, to generally communicate with the devices, etc.

In some cases, the software may need to be able to determine whether or not certain writes have reached the target device. For example, "device driver" software (which is typically coded specifically for the target device, to directly interface with the device on behalf other programs such as of the operating system and/or application programs that may be running on the processor as well) may frequently need to determine that writes initiated by the device driver software have reached the target device. The device driver software may need to be able to determine that writes which change the configuration of the target device (and thus may cause the target device to behave differently for subsequent reads and writes to the device) have reached the target device. As another example, the device driver software may program various registers in the device to perform a specific operation. The device driver software may need to determine that these writes have reached the target device before issuing a read or write which causes the specific operation to start. Other types of software may similarly have a need to determine that a given write or writes have reached a target device.

Many processor architectures (e.g. the MIPS architecture, as one example) treat a given write by the processor as completed once the processor successfully transmits that write on the interconnect to which it is coupled. This may often be before the write reaches the target device. Thus, the instruction set of the processor does not, itself, provide a means for determining when the write has reached the target device.

Software has attempted to "determine" that a write has reached the target device by simply waiting a specified amount of time deemed to be longer than the latency of the write reaching the target. However, the target device may be coupled to the processor through interconnect that may include one or more bridges and other devices which may be transmitting reads and writes as well. Thus, the latency of the writes to reach the target device may not be predictable, and may in some cases exceed the specified amount of time. Thus, the software may issue subsequent reads or writes before the given write reaches the target device.

Another attempt to "determine" that a write has reached the target device is to issue a read to the same address as the write in an attempt to "flush" the write. When the read data returns, the software assumes that the write has reached the destination. However, not all systems guarantee that reads and writes will be processed (and reach the target device) in the order issued. Thus, this mechanism may not ensure that the write has reached the target device.

SUMMARY OF THE INVENTION

An apparatus is described, which includes a storage location and a write monitor circuit coupled to the storage location. The storage location is configured to store a write response indicator which is capable of indicating a reception of at least one write response. Each write response indicates that a corresponding write has reached a target device of that write. The write monitor circuit is configured to update the write response indicator in response to receiving an indication of a first write response. A computer accessible medium comprising one or more data structures representing the above apparatus is also described. The write response indicator may be used, in some embodiments, to determine whether or not write responses have been received (and thus that corresponding writes have reached a target device).

A computer accessible medium may comprises instructions which, when executed: (i) initialize a write response indicator which is capable of indicating a reception of at least one write response; and (ii) issue one or more writes to a target device, wherein the target device is configured to response to each of the writes with a write response to be indicated by the write response indicator.

A method is also described. A write response indicating that a corresponding write has reached a target device of that write is detected. In response to detecting the write response, a write response indicator capable of indicating a reception of at least one write response is updated.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 1:
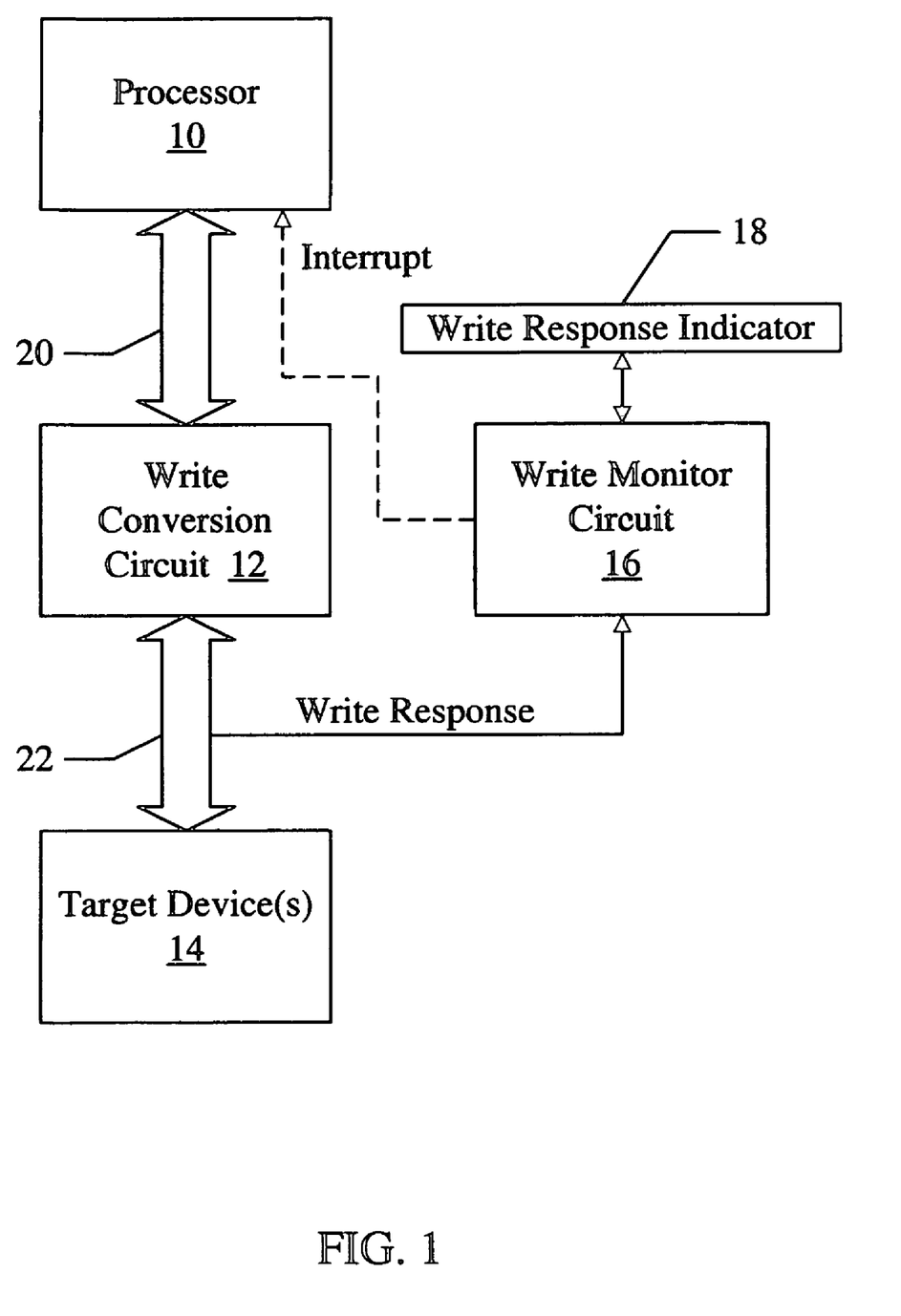
FIG. 1 is a block diagram of one embodiment of an apparatus for tracking writes in a system.

Turning now to FIG. 1, a block diagram of one embodiment of an apparatus for tracking writes in a system is shown. Other embodiments are possible and contemplated.

In the embodiment of FIG. 1, the apparatus includes at least one processor 10, a write conversion circuit 12, a target device or devices 14, a write monitor circuit 16, and a storage location 18. The processor 10 is coupled, via a first interconnect 20, to the write conversion circuit 12, which is further coupled, via a second interconnect 22, to the target device 14. The write monitor circuit 16 is coupled to receive a write response indication ("write response" in FIG. 1). The write monitor circuit 16 is further coupled to the storage location 18, which is configured to store a write response indicator. The write monitor circuit 16 may optionally, in some embodiments, be coupled to interrupt the processor 10 ("interrupt" in FIG. 1) either directly or indirectly.

Generally, the processor 10 may initiate one or more writes to the target device 14 on the interconnect 20. The write monitor circuit 16 monitors for indications of write responses corresponding to the one or more writes, and records write responses in the write response indicator stored in the storage location 18. In one embodiment, the processor 10 may read the storage location 18 to retrieve the write response indicator (and thus determine whether or not the appropriate write responses have occurred). In another embodiment, the write monitor circuit may cause an interrupt of the processor 10 in response to the write response indicator reaching a predetermined value (either a programmable value or a fixed value). Using the write response indicator (or the interrupt), the software executing on the processor 10 may determine that writes initiated by the processor 10 have reached the target device.

As used herein, a "write response" is an indication that a corresponding write has reached the target device of that write. In some cases, the write response may also include additional information. For example, the write response may include an error field indicating whether or not an error occurred for the write in the target device. Depending on the type of interconnect 22, the write response may take a variety of forms. For example, if the interconnect 22 comprises a bus (such as the peripheral component interconnect (PCI) bus) to which the target device 14 is coupled, the completion of the write operation on the bus (including the transfer of the write data) without error may be the write response. If the interconnect 22 comprises a packet-based interface (e.g. the HyperTransport™ interface), a packet may be defined to be the write response. For example, in the HyperTransport™ interface, a target done packet is defined which is used by the target to respond to certain writes (non-posted writes). The transmission of the target done packet corresponding to the write on the HyperTransport™ interface may comprise the write response. As another example, one or more "side band" signals may be defined between the target device 14 and the write monitor circuit 16 to indicate that a write has reached the target device.

The write monitor circuit 16 may monitor the interconnect 22 (and/or the target device 14) to detect the write responses. Alternatively, the write monitor circuit 16 may be indirectly informed (e.g. by the write conversion circuit 12 or other circuitry) that a write response has been detected. Thus, the write monitor circuit 16 may generally receive an indication of the write response.

As mentioned above, the write monitor circuit 16 records the write responses in the write response indicator stored in the storage location 18. As used herein, a "write response indicator" is any value for indicating that at least one write response has been received, and may be for indicating that multiple write responses have been received. In one embodiment, the write response indicator may be a bit. If the bit is set, then a write response has been received. If the bit is clear, then a write response has not been received. Alternatively, the opposite assignment of bit states to meanings may be used. A bit may be used, for example, if the software executing on the processor 10 checks for write responses after each write is issued, before issuing the next write. In another embodiment, the write response indicator may be a counter indicative of the number of write responses received. The counter may be used, for example, if up to N writes are issued by the software before checking the write response indicator for write responses. The counter may be initialized by the software prior to initiating the writes. For example, the counter may be initialized to zero, and may be incremented by the write monitor circuit 16 in response to each write response that is detected. Alternatively, the counter may be initialized to N (the number of writes to be issued) and may be decremented by the write monitor circuit 16 in response to each write response that is detected. Other representations of the write responses may also be used. For example, a bit vector with each bit representing a write response may be used, a tagging system to identify writes and write responses may be used, etc.

The processor 10 generally comprises circuitry for executing instructions defined in a processor instruction set architecture. Any processor instruction set architecture may be used. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The instruction set architecture may include store instructions (which cause writes to be generated by the processor 10 on the interconnect 20, although some store instructions may be completed in internal caches of the processor 10 and thus may cause no writes in those cases). The store instructions may be defined to be completed when the processor 10 successfully completes the store in an internal cache or successfully transmits the write on the interconnect 20 to which the processor 10 is coupled. These types of writes are referred to as "posted writes". In general, a posted write is a write which is completed by the source of the write prior to reaching the target of the write. Thus, there isn't a direct mechanism for the target to feedback to the source that the write has reached the target, nor for the target to provide any error information or other information about the completion of the write. On the other hand, a "non-posted write" is a write which is not completed by the source until the write reaches the target of the write. Thus, the non-posted write may be completed with a write response indicating that the write has reached the target. For the posted writes, the processor 10 may use the write response indicator to detect when the writes have reached the target device, if such detection is desired.

The write conversion circuit 12 is coupled to receive the posted writes from the processor 10 and to generate corresponding non-posted writes on the interconnect 22. The corresponding non-posted write for a given write may have the same properties as the given write (e.g. the same address, same number of bytes, same write data, etc.) except that the non-posted write is non-posted (and thus a write response occurs for the non-posted write). The write conversion circuit 12 may be configured to generate non-posted writes corresponding to posted writes in any fashion. For example, the write conversion circuit 12 may generate a non-posted write for each posted write received from the processor 10. Alternatively, the write conversion circuit 12 may generate non-posted writes for each posted write targeted at the target device 14. If multiple target devices are coupled to the interconnect 22, the write conversion circuit 12 may be configured to generate non-posted writes for posted writes targeted at select target devices. The write conversion circuit 12 may be configured to generate non-posted writes for addresses in a given address range. The write conversion circuit 12 may be configured to generate non-posted writes responsive to a mode (e.g. the mode may be in a state causing non-posted write generation during configuration bring up, and may be in a state not causing non-posted write generation at other times, where the mode is changed by software and/or hardware mechanisms). If the write conversion circuit 12 does not generate a non-posted write corresponding to a given posted write, the write conversion circuit 12 passes the posted write on to the interconnect 22.

The write conversion circuit 12 may be optional. In some embodiments, for example, the target device 14 may treat writes (or certain writes, e.g. in bringup mode or configuration writes) as non-posted even if they are posted, at least in terms of transmitting a write response for the write.

In addition to generating non-posted writes corresponding to posted writes, the write conversion circuit 12 may, in some embodiments, convert the write from one format (used on the interconnect 20) to another format (used on the interconnect 22). For example, the interconnect 20 may be a processor bus on which writes are transmitted as an address and command encoding (along with other control signals as desired) and data, while the interconnect 22 may be a packet based interconnect such as HyperTransport™, in which a write may include a write command packet and the data as well as a target done response for non-posted writes. Alternatively, the interconnect 22 may be a bus as well, but may have a different protocol than the processor bus.

As used herein, an interconnect is any sort of communication medium. Exemplary interconnect may include, for example, buses, crossbar connections, point to point connections in a ring, star, daisy chain, or any other topology, meshes, cubes, etc. Additionally, interconnect may include combinations of various interconnect, with bridge circuitry to convert from one interconnect to the other.

The storage location 18 may be any type of storage capable of storing the write response indicator. For example, the storage location 18 may be a register or other clocked storage which may be addressable by the processor 10. For example, the register may be memory mapped to a given memory address that may be generated by the processor 10, or may be mapped to I/O space. Alternatively, the storage location 18 may be a memory location in a memory (not shown in FIG. 1) addressable by the processor 10. Any type of clocked storage device or memory may be used.

The target device 14 may represent any circuitry for providing functionality in the system including the apparatus shown in FIG. 1. Exemplary target devices may include any type of input/output (I/O) circuitry such as graphics devices or other video devices, audio devices, communications devices (e.g. network interfaces, modems, parallel ports, serial ports, external interfaces such as universal serial bus (USB), firewire, etc.), storage devices (fixed or floppy disk drives, CD-ROMs, DVD devices, etc.), etc.

Generally, speaking, reads and writes may be initiated by a source and identify (e.g. via an address) a target. A read is a transfer of data from the target to the source, while a write is a transfer of data from the source to the target.

It is noted that, while one processor 10 is shown in FIG. 1, other embodiments may include any number or processors, as desired. One or more target devices may be included, coupled to the same interconnect 22 or to different interconnect.

Figure 2:
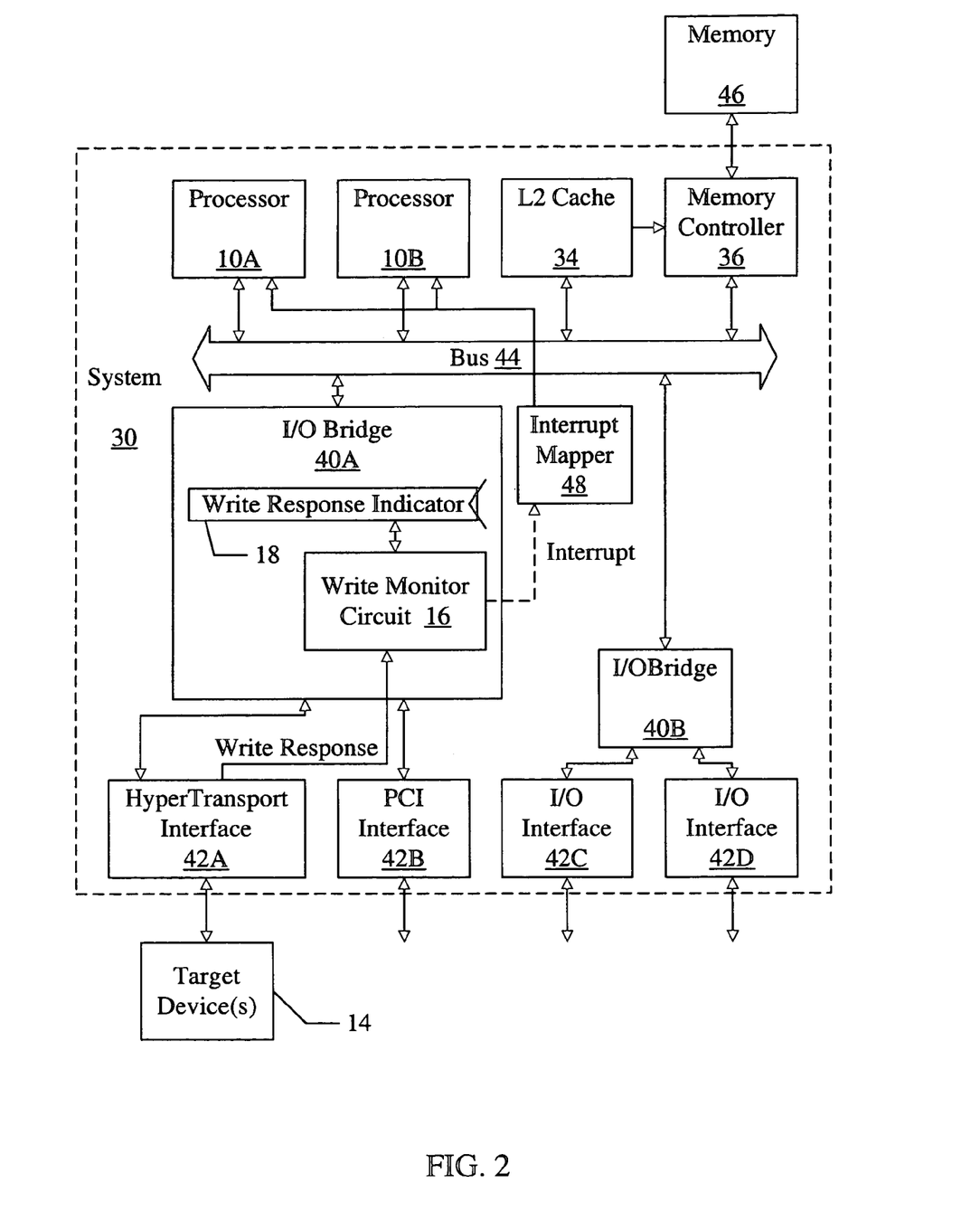
FIG. 2 is a block diagram of a second embodiment of an apparatus for tracking writes in a system.

Turning now to FIG. 2, a block diagram of one embodiment of a system 30 which may employ an apparatus for tracking writes in the system is shown. Other embodiments are possible and contemplated. In the embodiment of FIG. 1, the system 30 includes processors 10A–10B, an L2 cache 34, a memory controller 36, a pair of input/output (I/O) bridges 40A–40B, various I/O interface circuits 42A–42D, and an interrupt mapper 48. The system 30 may include a bus 44 for interconnecting the various components of the system 30. As illustrated in FIG. 1, each of the processors 10A–10B, the L2 cache 34, the memory controller 36, and the I/O bridges 40A–40B are coupled to the bus 44. Thus, each of the processors 10A–10B, the L2 cache 34, the memory controller 36, and the I/O bridges 40A–40B may be an agent on the bus 44 for the illustrated embodiment. The I/O bridge 40A is coupled to the I/O interface circuits 42A–42B (specifically, in the illustrated embodiment, a HyperTransport™ interface circuit 42A and a PCI interface circuit 42B), and the I/O bridge 40B is coupled to the I/O interface circuits 42C–42D. Any number of I/O interface circuits 42A–42D may be included, and may be coupled to one or more I/O bridges 40A–40B in any configuration. In one embodiment, the I/O interface circuits 42C–42D may include network interface circuits, serial interface circuits, system management bus (SMBus) interface circuits, Personal Computer Memory Card International Association (PCMCIA) interface circuits, etc. The L2 cache 34 is coupled to the memory controller 36, which is further coupled to a memory 46. The interrupt mapper 48 is optionally coupled to receive an interrupt request from the write monitor circuit 16 and is coupled to supply interrupts to the processors 10A–10B. As illustrated in FIG. 2, the I/O bridge 40A includes the storage location 18 storing the write response indicator and the write monitor circuit 16. The write monitor circuit 16 is coupled to receive a write response from the HyperTransport™ interface circuit 42A.

In the illustrated embodiment, the I/O bridge 40A implements the write monitor circuit 16 for tracking writes to the target device or devices 14 on the HyperTransport™ interface. The I/O bridge 40A also includes the storage location 18 (e.g. as a status register memory mapped for the processors 10A–10B to access), although in other embodiments the storage location 18 may be in the memory 46. The I/O bridge 40A routes writes initiated by the processors 10A–10B and targeting the target device 14 to the HyperTransport™ interface circuit 42A, which formats the writes according to the HyperTransport™ interface and transmits them on the interface. Additionally, in response to target done packets from the target device 14 corresponding to the writes, the HyperTransport™ interface circuit 42A signals the write monitor circuit 16. In response, the write monitor circuit 16 updates the write response indicator.

In some embodiments, software executing on the processors 10A–10B may read the write response indicator from the storage location 18 to determine that writes to the target device 14 have reached the target device 14. In other embodiments, the write monitor circuit 16 may be configured to interrupt one of the processors 10A–10B in response to the write response indicator reaching a specified value (either programmably specified or a fixed value). The write monitor circuit 16 may assert an interrupt request to the interrupt mapper 48, which may also receive other interrupt requests (not shown) from other interrupt sources within the system 30. The interrupt mapper 48 may map each interrupt to one of the processors 10A–10B, and may assert an interrupt signal to the selected processor 10A–10B. The processors 10A–10B may access the interrupt mapper 48 to determine the source of a given interrupt.

The write conversion circuit 12 shown in FIG. 1 is not shown in the I/O bridge 40A. Since the I/O bridge 40A converts transactions received on the bus 24 to communications to the I/O interface circuits 42A–42B, which format the communications for transmission on the corresponding interfaces, the operation of the write conversion circuit may be included in one or both of the I/O bridge 40A or the I/O interface circuits 42A–42B.

While I/O bridge 40A is shown as including the write monitor circuit 16 and the storage location 18, other embodiments may include the write monitor circuit 16 in the I/O bridge 40B as well. Additionally, the write monitor circuit 16 may be used to monitor for write responses from more than one interface, or from different interfaces. For example, the write monitor circuit 16 may be used to monitor for write responses from the PCI interface circuit 42B or other interface circuits.

The processors 10A–10B may be generally be similar to the processor 10 shown in FIG. 1. While the system 30 as shown in FIG. 1 includes two processors, other embodiments may include one processor or more than two processors, as desired.

The L2 cache 34 is a high speed cache memory. The L2 cache 34 is referred to as "L2" since the processors 10A–10B may employ internal level 1 ("L1") caches. If L1 caches are not included in the processors 10A–10B, the L2 cache 34 may be an L1 cache. Furthermore, if multiple levels of caching are included in the processors 10A–10B, the L2 cache 34 may be an outer level cache than L2.

While the L2 cache 34 is labeled L2 with respect to it position in the processor cache hierarchy, the L2 cache 34 may actually service cacheable transactions from any device on the bus 44. Thus, the L2 cache 34 may be viewed as part of a memory subsystem including the memory controller 36 (and the memory 46 coupled thereto). If a cacheable read transaction hits in the L2 cache 34, even if the source of the read transaction is an I/O interface circuit 42A–42D, the L2 cache 34 supplies the data for the read transaction. If a cacheable write transaction hits in the L2 cache 34, even if the source of the write transaction is an I/O interface circuit 42A–42D, the L2 cache 34 updates with the data for the write transaction.

The L2 cache 34 may employ any organization, including direct mapped, set associative, and fully associative organizations. In one particular implementation, the L2 cache 34 may be a set associative cache.

The memory controller 36 is configured to access the memory 46 in response to memory transactions received on bus 44. The memory controller 36 receives a hit signal from the L2 cache 34, and if a hit is detected in the L2 cache 34 for a memory transaction, memory controller 36 does not respond to that memory transaction. Other embodiments may not include the L2 cache 34 and the memory controller 36 may respond to each memory transaction. If a miss is detected by the L2 cache 34, or the memory transaction is non-cacheable, the memory controller 36 may access the memory 46 to perform the read or write operation. The memory controller 36 may be designed to access any of a variety of types of memory. For example, the memory controller 36 may be designed for synchronous dynamic random access memory (SDRAM), and more particularly double data rate (DDR) SDRAM. Alternatively, the memory controller 36 may be designed for DRAM, Rambus DRAM (RDRAM), SRAM, or any other suitable memory device.

The I/O bridges 40A–40B link one or more I/O interface circuits (e.g. the I/O interface circuits 42A–42B for the I/O bridge 40A and the I/O interface circuits 42C–42D for I/O bridge 40B) to the bus 44. While I/O interface circuits are shown in FIG. 1, generally an I/O bridge 40A–40B may link one or more I/O interface circuits or I/O devices. The I/O bridges 40A–40B may serve to reduce the electrical loading on the bus 44 if more than one I/O interface circuit 42A–42I is bridged by that I/O bridge. Generally, the I/O bridge 40A performs transactions on the bus 44 on behalf of the I/O interface circuits 42A–42B and relays transactions targeted at the I/O interface circuit 42A–42B from the bus 44 to that I/O interface circuit 42A–42B. Similarly, the I/O bridge 40B generally performs transactions on the bus 44 on behalf of the I/O interface circuits 42C–42D and relays transactions targeted at an I/O interface circuit 42C–42D from the bus 44 to that I/O interface circuit 42C–42D.

The PCI interface circuit 42B may be a circuit for interfacing to the PCI bus. In one embodiment, the PCI interface circuit 42B may implement the 66 MHz PCI specification version 2.2. The PCI interface circuit 42B may be configurable to be the host bridge on the PCI bus.

The HyperTransport™ interface circuit 42A may be a circuit for interfacing to the HyperTransport™ fabric. The HyperTransport™ interface circuit 42A may be the host bridge on the HyperTransport™ fabric.

The bus 44 may be a split transaction bus, in one embodiment. The bus 44 may employ a distributed arbitration scheme, in one embodiment. In one embodiment, the bus 44 may be pipelined. The bus 44 may employ any suitable signaling technique. For example, in one embodiment, differential signaling may be used for high speed signal transmission. Other embodiments may employ any other signaling technique (e.g. TTL, CMOS, GTL, HSTL, etc.).

It is noted that the system 30 (and more particularly the processors 10A–10B, the L2 cache 34, the memory controller 36, the I/O interface circuits 42A–42I, the I/O bridges 40A–40B and the bus 44) may be integrated onto a single integrated circuit as a system on a chip configuration. In another configuration, the memory 46 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, bus 44 may not be pipelined, if desired.

It is noted that, while FIG. 1 illustrates the I/O interface circuits 42A–42D coupled through the I/O bridges 40A–40B to the bus 44, other embodiments may include one or more I/O interface circuits directly coupled to the bus 44, if desired. While a shared bus is used in the present embodiment, any sort of interconnect may be used in other embodiments.

Figure 3:
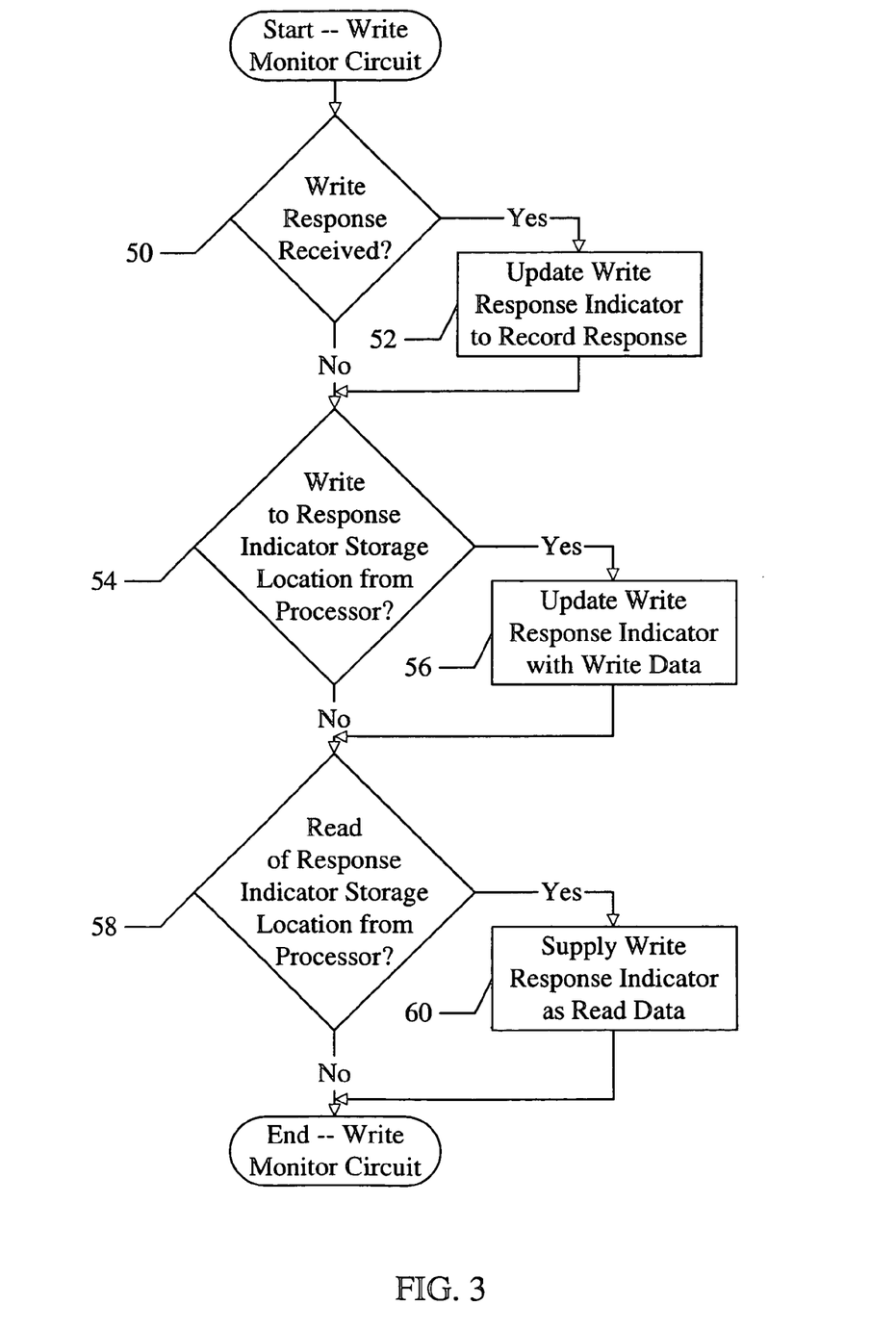
FIG. 3 is a flowchart illustrating operation of one embodiment of a write monitor circuit.

Turning now to FIG. 3, a flowchart is shown illustrating operation of one embodiment of the write monitor circuit 16. Other embodiments are possible and contemplated. The blocks shown in FIG. 3 are illustrated in a particular order for ease of understanding. However, other orders may be used. Furthermore, blocks may be performed in parallel by the circuitry forming the write monitor circuit 16. For example, each of the blocks 50, 54, and 58 (and blocks dependent thereon) are independent of each other and may be performed in parallel by circuitry in the write monitor circuit 16.

If an indication of a write response is received (decision block 50), the write monitor circuit 16 updates the write response indicator to record the response (block 52). For example, in one embodiment the write response indicator may be a counter and the write monitor circuit 16 may increment or decrement the counter.

If the write monitor circuit 16 receives a write targeting the storage location 18 (decision block 54), the write monitor circuit 16 updates the storage location 18 with the write data (block 56). Software may use writes to the storage location 18 to initialize the write response indicator for a set of writes that the software is going to issue. For example, in an embodiment in which the write response indicator is a counter that is incremented for each write response, the counter may be initialized to zero. In an embodiment in which the write response indicator is a counter that is decremented for each write response, the counter may be initialized to the number of writes to be issued.

If the write monitor circuit 16 receives a read targeting the storage location 18 (decision block 58), the write monitor circuit 16 supplies the write response indicator from the storage location 18 (block 60). Software may use reads of the storage location 18 to check the status of the write response indicator, to determine when the write responses for a set of writes issued by the software have been received.

Figure 4:
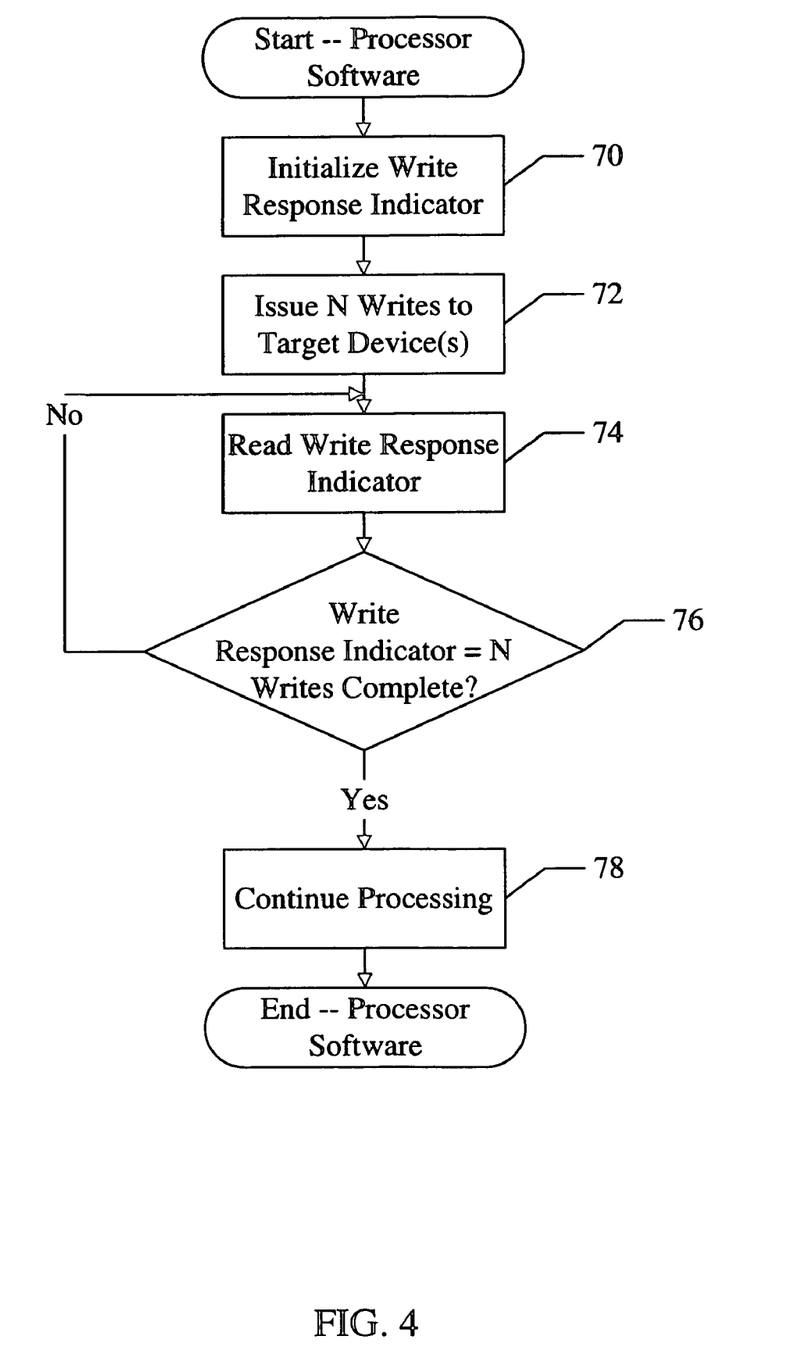
FIG. 4 is a flowchart illustrating operation of one embodiment of software executing on a processor.

Turning now to FIG. 4, a flowchart is shown illustrating operation of one embodiment of software executing on a processor and interacting with the write monitor circuit 16 as shown in FIG. 3. Other embodiments are possible and contemplated. The blocks shown in FIG. 4 are illustrated in a particular order for ease of understanding, but other orders may be used.

The software initializes the write response indicator (block 70). Particularly, the software performs a write to the storage location 18 to initialize the write response indicator. The value the software uses for initializing the write response indicator may vary from embodiment to embodiment, as mentioned above.

The software issues up to N writes to the target device or devices (block 72), where N is an integer greater than zero. The number of writes which may be issued may vary from embodiment to embodiment, up to as many writes as the write response indicator is capable of tracking.

The software then reads the write response indicator (block 74) and determines if the write response indicator indicates that N writes have reached the target device 14 (decision block 76). For example, if the write response indicator is a counter initialized to zero and incremented for each write response, the write response indicator may be compared to N. If the write response indicator does not indicate that N writes have reached the target device, the software repeats the read of the write response indicator (block 74) and determining if the write response indicator indicates that N writes have reached the target device 14 (decision block 76) until the write response indicator does indicate that N writes have reached the target device 14. Subsequently, the software continues processing (which may include more reads/writes to the target device 14) (block 78).

Figure 5:
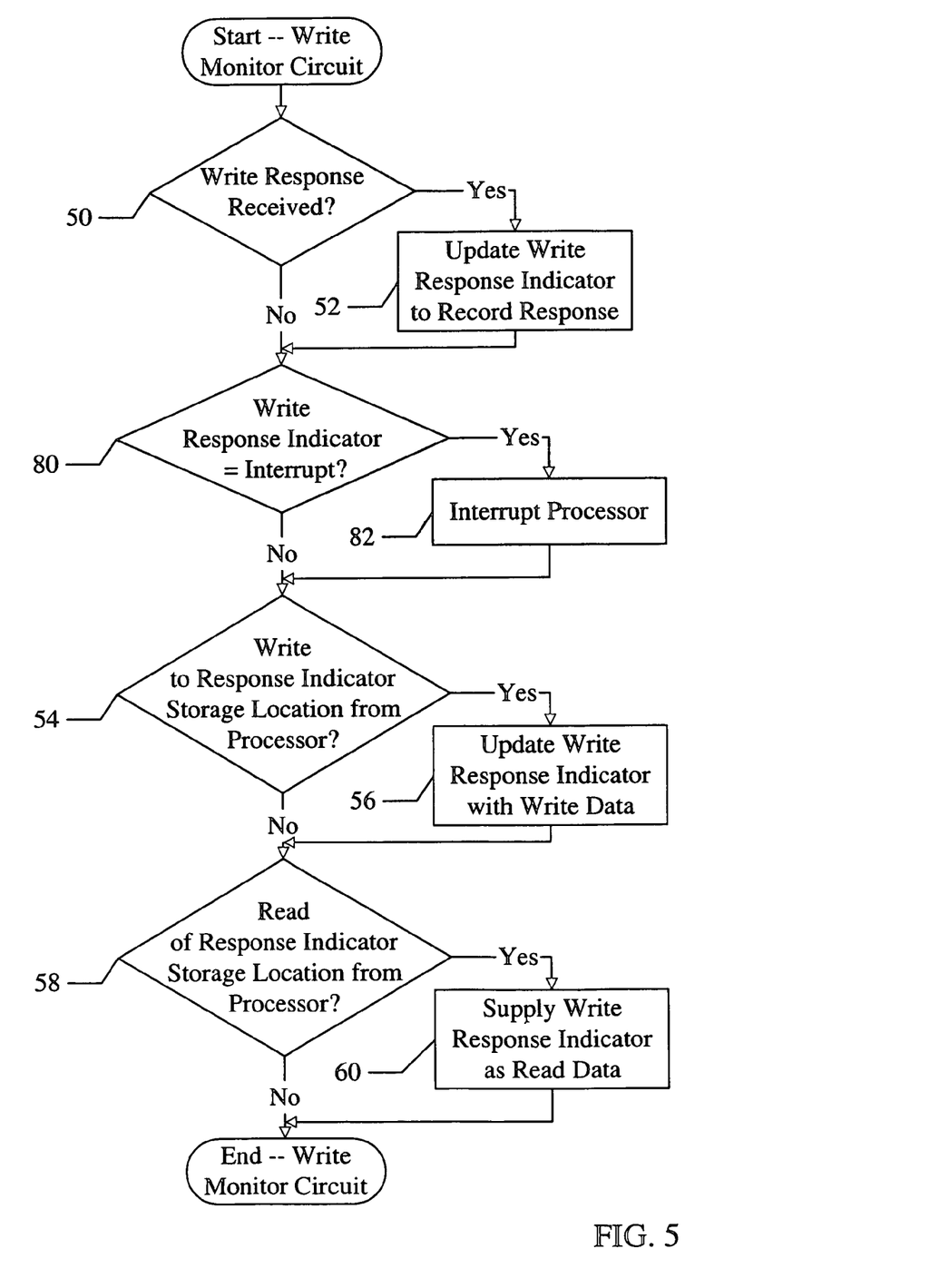
FIG. 5 is a flowchart illustrating operation of a second embodiment of a write monitor circuit.

Turning now to FIG. 5, a flowchart is shown illustrating operation of a second embodiment of the write monitor circuit 16. Other embodiments are possible and contemplated. The blocks shown in FIG. 5 are illustrated in a particular order for ease of understanding. However, other orders may be used. Furthermore, blocks may be performed in parallel by the circuitry forming the write monitor circuit 16. For example, each of the blocks 50, 54, 58, and 80 (and blocks dependent thereon) are independent of each other and may be performed in parallel by circuitry in the write monitor circuit 16.

Similar to the embodiment of FIG. 3, the embodiment of FIG. 5 may update the write response indicator in response to an indication of a write response (blocks 50 and 52), update the write response indicator with write data from a write targeting the storage location 18 (blocks 54 and 56), and supply the write response indicator for a read targeting the storage location 18 (blocks 58 and 60).

Additionally, however, the embodiment of FIG. 5 is also configured to interrupt the processor in response to the write response indicator reaching a specified value. If the write response indicator is equal to the specified value (decision block 80), the write response circuit 16 signals for an interrupt of the processor (block 82). The value may be specified programmably (e.g. by a write to another storage location to which the write monitor circuit 16 may be coupled), or may be fixed. In one example, the write response indicator may be a counter and the write monitor circuit 16 may be configured to decrement the counter in response to each write response. In such an example, the write response indicator may be initialized to the number of writes (N) and the write monitor circuit 16 may cause an interrupt when the write response indicator equals zero. Alternatively, the write response indicator may be initialized at zero and increment, and another storage location may be provided for storing a programmable value to be compared to the write response indicator to cause an interrupt.

Figure 6:
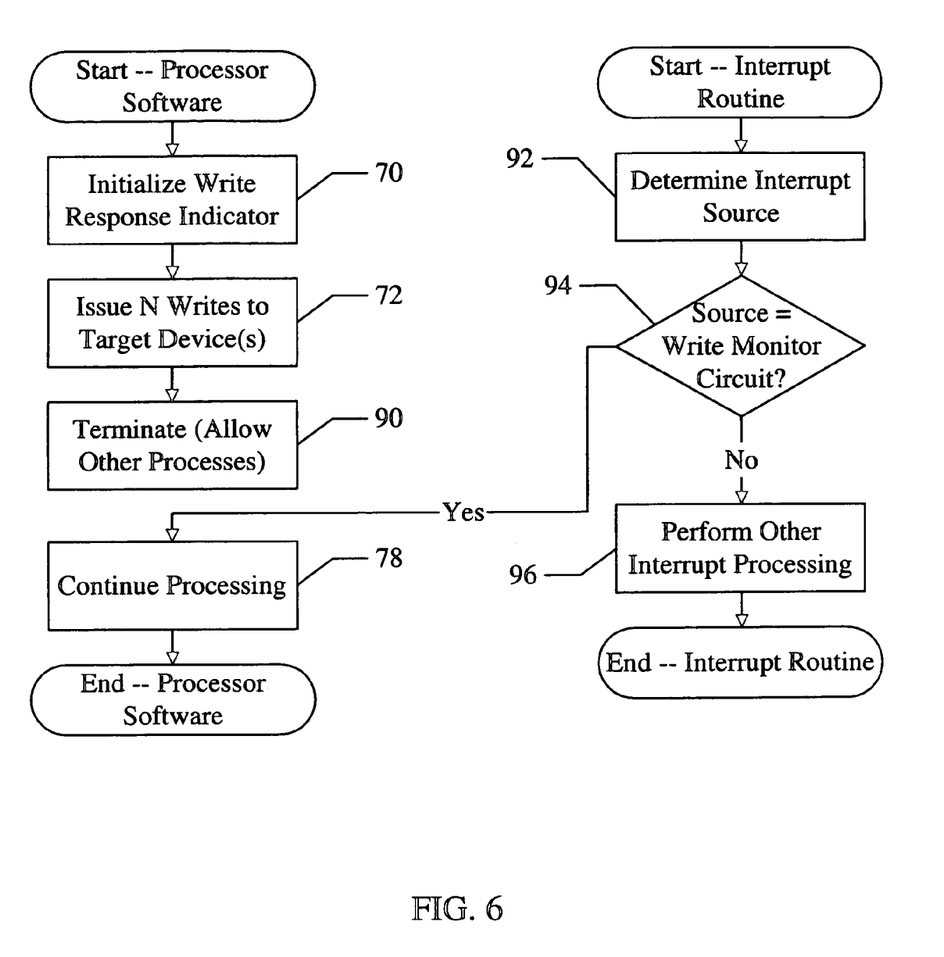
FIG. 6 is a flowchart illustrating operation of a second embodiment of software executing on a processor.

FIG. 6 is a flowchart illustrating operation of a second embodiment of software executing on a processor and interacting with the write monitor circuit 16 as shown in FIG. 5. Other embodiments are possible and contemplated. The blocks shown in FIG. 6 are illustrated in a particular order for ease of understanding, but other orders may be used.

Similar to the embodiment of FIG. 4, the software in the embodiment of FIG. 6 may initialize the write response indicator (block 70) and issue up to N writes to the target device 14 (block 72). Then, the software may terminate (block 90). The termination may allow other processes to be executed by the processor until the interrupt indicating that the write responses have been received occurs. The termination may typically be a return of control to the operating system (e.g. a return instruction, or a branch instruction targeting an operating system entry point) or other control code executed by the processor.

Also shown in FIG. 6 is a flowchart of an interrupt routine that may be executed by the processor in response to an interrupt. The interrupt routine determines the source of the interrupt (block 92). For example, in the embodiment of FIG. 2, the interrupt routine may read resources in the interrupt mapper 48 to determine the source of the interrupt. If the source of the interrupt is the write monitor circuit 16 (decision block 94, "yes" leg), the interrupt routine transfers control back to the software that initiated the writes, to continue processing as desired (block 78). If the source of the interrupt is not the write monitor circuit 16 (decision block 94, "no" leg), the interrupt routine may perform other interrupt processing as desired (block 96).

It is noted that the term "software" as used herein refers to a set of instructions which, when executed, performs the functions described for the software. Similarly, the term "routine" refers to a set of instructions which, when executed, performs the functions described for those routines.

Figure 7:
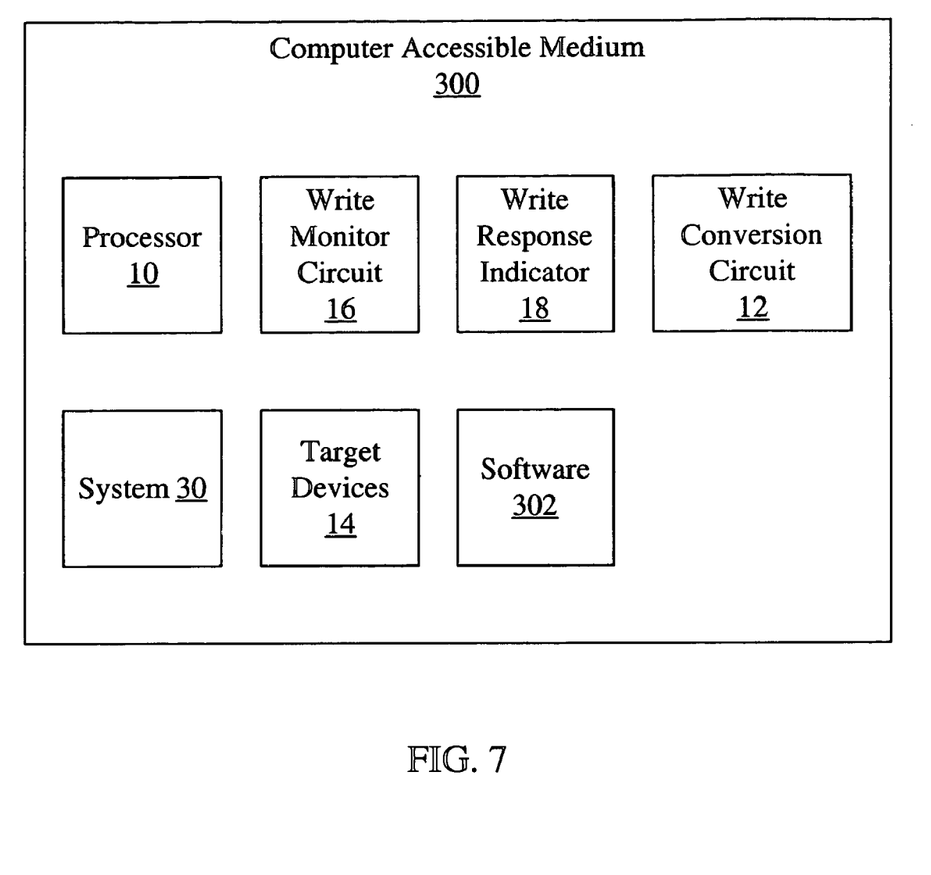
FIG. 7 is a block diagram of a computer accessible medium.

Turning next to FIG. 7, a block diagram of a computer accessible medium 300 including one or more data structures representative of the various circuits described herein is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry carried on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired.

In the illustrated embodiment, the computer accessible medium 300 includes data structure(s) representing one or more of the processor 10, the write monitor circuit 16, the write response indicator storage location 18, the write conversion circuit 12, the system 30, and the target device or devices 14. Additionally, the computer accessible medium 300 may include various software 302 (e.g. any of the software illustrated in FIGS. 3–6).

While computer accessible medium 300 carries a representation of the various circuitry noted above, other embodiments may carry a representation of any portion of the above circuitry, as desired.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a processor to perform a write operation to send data to a target device, but in which the write operation is a posted write; and
   a bridge coupled between the processor and the target device to receive the posted write from the processor and to subsequently perform the write operation to the target device as a non-posted write, the bridge including a write monitor circuit to detect when the non-posted write has reached the target device and to generate an indication in response, and the bridge circuit further including a storage device to store the indication for use to inform the processor that the data has reached the target device.

2. The apparatus as recited in claim 1 wherein the storage device is a counter indicating a number of indications generated when multiple posted writes are sent from the processor to one or more target devices.

3. The apparatus as recited in claim 2 wherein the counter is incremented in response to each indication generated.

4. The apparatus as recited in claim 2 wherein the counter is decremented in response to each indication generated.

5. The apparatus as recited in claim 1 wherein the bridge generates an interrupt to the processor when the indication is generated.

6. The apparatus as recited in claim 1 wherein the storage device is written into when the indication is generated.

7. The apparatus as recited in claim 6 wherein the storage device is read to determine if the indication has been generated.

8. The apparatus as recited in claim 1 wherein the bridge further includes a write conversion circuit to convert the posted write from the processor to the non-posted write to write to the target device.

9. The apparatus as recited in claim 1 wherein the storage device is a register.

10. The apparatus as recited in claim 1 wherein the bridge and the processor are integrated onto a single integrated circuit.

11. A method comprising:
    issuing a write from a processor to send data to a target device;
    posting the write in a bridge;
    converting the posted write to a non-posted write to write from the bridge to the target device;
    detecting when the non-posted write reaches the target device;
    generating and storing an indication in the bridge when the non-posted write is detected to have reached the target device; and
    informing the processor that the write from the processor has reached the target device by use of the stored indication.

* * * * *